March 31, 1936.  H. B. BROWN  2,035,634
THERMOMETER
Filed Feb. 23, 1935
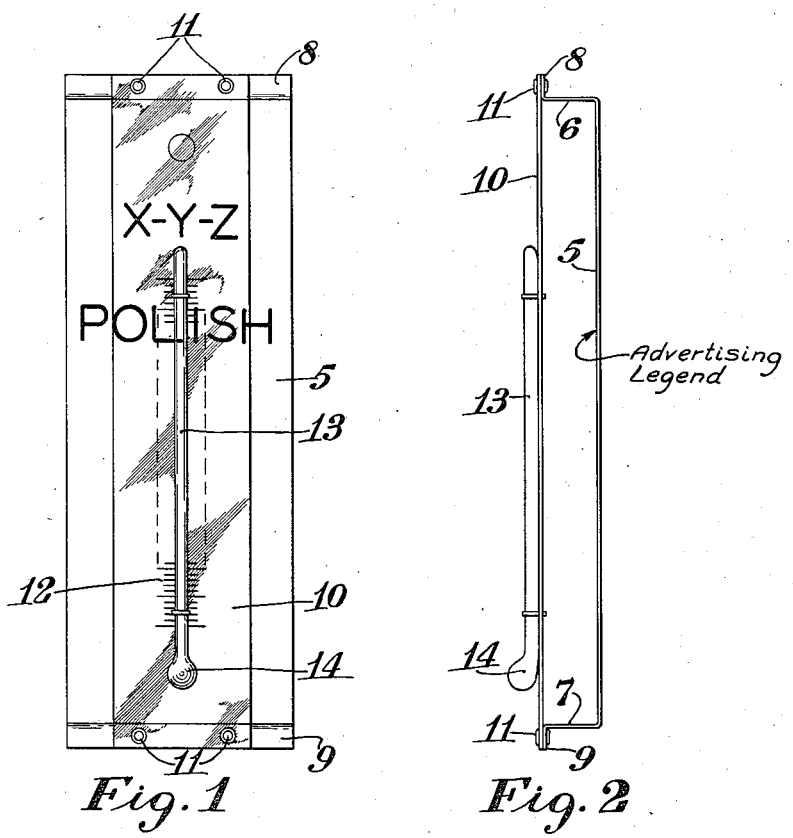
INVENTOR
H. BRAINARD BROWN
BY D. Clyde Jones
ATTORNEY Patented Mar. 31, 1936

2,035,634

UNITED STATES PATENT OFFICE 2,035,634

THERMOMETER

H. Brainard Brown, Rochester, N. Y., assignor to Taylor Instrument Companies, Rochester, N. Y., a corporation of New York Application February 23, 1935, Serial No. 7,735

2 Claims. (Cl. 73—52)

This invention relates to thermometers and particularly to advertising thermometers.

In advertising thermometers it is especially desirable that the temperature indicating portion thereof be arranged with respect to the advertising legends thereon, so that when reading the temperature the observer will necessarily have his attention directed to the advertising. In former types of advertising thermometers it has been customary to arrange the advertising legends around the graduated scale portion of the thermometer so that it was possible to avoid reading the advertising matter.

In accordance with the present invention it is proposed to mount the thermometer tube on a transparent graduated scale plate, which plate is superimposed over the advertising legends appearing on the thermometer support, with the result that the reading of the temperature necessarily requires noting the advertising legends in the background.

For a clearer understanding of the invention, reference is made to the drawing in which Fig. 1 is a front elevation and Fig. 2 is a side elevation of the improved thermometer.

In the drawing, 5 designates a support on the front face of which, as viewed in Fig. 1, suitable advertising legends appear. This support which is preferably made of sheet metal or like workable material, is formed with upwardly projecting end portions 6 and 7, respectively, provided with flanges 8 and 9 extending parallel to the principal plane of the support. A transparent scale plate 10 of glass, cellulose nitrate or the like, is fastened in generally parallel spaced relation to the main portion of the support in superimposed relation to the legends thereon, by means of suitable eyelets 11 passing through the ends of the scale plate and the flanges 8 and 9. The scale plate, which is graduated as indicated at 12, has mounted in any suitable manner thereon in proper relation to the graduations a thermometer tube including the stem 13 and the bulb 14.

By this construction the advertising legends are placed directly back of the graduations on the scale plate so that in observing the temperature, these legends in the background are forcefully brought to the attention of the observer.

I claim:

1. In an advertising thermometer, an integral support of sheet material having bent-up ends, a transparent graduated scale plate mounted on said bent-up ends in superimposed relation to a part of said support, and a thermometer tube attached to said scale plate adjacent the graduations thereon.

2. In a thermometer, a support made of sheet material and having bent-up ends provided with flanges extending generally parallel to the main part of the support, a transparent graduated scale plate mounted on said flanges in superimposed relation to a part of said support, and a thermometer tube attached to said scale plate adjacent the graduations thereon.

H. BRAINARD BROWN.